United States Patent [19]
Subramanian et al.

[11] Patent Number: 5,922,120
[45] Date of Patent: Jul. 13, 1999

[54] PROCESS FOR PRODUCING COATED TIO$_2$ PIGMENT USING COOXIDATION TO PROVIDE HYDROUS OXIDE COATINGS

[75] Inventors: Narayanan Sankara Subramanian, Hockessin; Pratibha Laxman Gai; Russell Bertrum Diemer, Jr., both of Wilmington; Alvin Allen, Claymont, all of Del.; John Steven Gergely, Avondale, Pa.

[73] Assignee: E. I. du Pont de Nemours and Company, Wilmington, Del.

[21] Appl. No.: 08/997,678

[22] Filed: Dec. 23, 1997

[51] Int. Cl.$^6$ ........................................... C09C 1/36
[52] U.S. Cl. ..................... 106/437; 106/442; 106/443; 106/444; 106/446; 423/611; 423/612; 423/613
[58] Field of Search ..................... 106/437, 442, 106/443, 444, 446; 423/611, 612, 613

[56] References Cited

U.S. PATENT DOCUMENTS

| | | | |
|---|---|---|---|
| 3,856,929 | 12/1974 | Angerman et al. | 423/613 |
| 4,214,913 | 7/1980 | Glaeser | 106/437 |
| 5,562,764 | 10/1996 | Gonzalez | 106/437 |
| 5,599,519 | 2/1997 | Haddow | 423/613 |
| 5,728,205 | 3/1998 | Allen et al. | 106/437 |
| 5,730,795 | 3/1998 | Herkimer | 106/437 |

FOREIGN PATENT DOCUMENTS

| | | | |
|---|---|---|---|
| 96/00699 | 1/1996 | WIPO | 106/437 |
| 96/06803 | 3/1996 | WIPO | 106/437 |
| WO 96/36441 | 11/1996 | WIPO . | |

OTHER PUBLICATIONS

Gas-Ohase Coating of Titania with Metal Oxides in an Aerosol Flow Reactor; G.P.Fotou et al; Proceedings of AIChE Meeting, 1996.

Gas-phase coating of TiO2 with SiO2 in a continuous flow hot-wall aerosol reactor; Q.H.Powell et al; Oct. 1996.

Synthesis of Alumina-and Alumina/Silica-Coated Titania Particles in an Aerosol Flow Reactor; Q.H.Powell et al, Jan. 1997.

A Theoretical Study on Gas-Phase Coating of Aerosol Particles, S.Jain, et al; Aug. 1996.

Chemical Kinetics of the Reactions of SiCl4, SiBr4, GeCl4, POCl3, and BCl3 with Oxygen [No Date].

Kinetics of Titanium (IV) Chloride Oxidation; S.E.Pratsinis et al; Apr. 1990.

Dopants in Vapor-Phase Synthesis of Titania Powders; M.K.Akhtar et al; Aug. 1992.

Primary Examiner—Anthony Green

[57] ABSTRACT

The present invention provides a process for producing titanium dioxide (TiO$_2$) pigment having a coating comprising silica and a second oxide selected from the group consisting of oxides of boron, phosphorus, magnesium, niobium, germanium, and mixtures thereof, comprising the steps of (a) reacting titanium tetrachloride (TiCl$_4$) in the vapor phase with an aluminum compound and an oxygen-containing gas in a reactor at a temperature in the range of about 900° C. to about 1600° C. to provide a gaseous suspension comprising TiO$_2$ particles, (b) contacting the gaseous suspension comprising the TiO$_2$ particles with a silicon halide and an oxide precursor of boron, phosphorus, magnesium, niobium, germanium, and mixtures thereof, and (c) cooling the gaseous suspension to produce TiO$_2$ pigment having a coating comprising silica and a second oxide.

12 Claims, 4 Drawing Sheets

PROCESS FOR PRODUCING COATED TIO₂ PIGMENT USING COOXIDATION TO PROVIDE HYDROUS OXIDE COATINGS

BACKGROUND OF THE INVENTION

1. Field of the Invention

The present invention relates to a process to prepare $TiO_2$ pigment involving adding both a first oxide precursor, which is a silicon halide such as $SiCl_4$, and at least one second oxide precursor to a gaseous suspension comprising $TiO_2$ particles. The second oxide is selected from oxide precursors of boron, phosphorus, magnesium, niobium, germanium, and mixtures thereof.

2. Description of the Related Art

The process for producing titanium dioxide ($TiO_2$) pigment by reacting an oxygen-containing gas and titanium tetrachloride ($TiCl_4$) at temperatures ranging from 900° to 1600° C. in a vapor phase is known. The resulting hot gaseous suspension of $TiO_2$ particles and free chlorine are discharged from the reactor and must be quickly cooled in a conduit, i.e., a flue, so that undesired $TiO_2$ particle size growth is prevented and particle agglomeration is minimized.

Titanium dioxide is widely used as a white pigment. In many commercial applications, such as paints, high durability is required, durability meaning the ability of the pigment to withstand the destructive effects of weather, most importantly, sunlight. Since $TiO_2$ is photoactive, and can promote degradation of paint systems, hydrous oxide coatings are applied to $TiO_2$ particles to improve durability. Typically hydrous oxide coatings on $TiO_2$ particles are prepared by wet chemical methods. These involve precipitation of the hydrous oxide, such as silica, alumina, zirconia, from solution. While these processes do provide somewhat durable coatings on the $TiO_2$ particles, they often result in uneven, non-uniform and porous coatings. These processes also often require milling of the pigment prior to the wet coating methods to break up soft aggregates to assure all particles are coated. Another problem with these processes is that they tend to provide coated $TiO_2$ particles which have low gloss. Further, these processes require substantial investment in equipment, involve time consuming, often complicated operations, and generate volumes of aqueous wastes.

It would therefore be desirable to have a process for making a durable $TiO_2$ pigment having particles with a dense uniform coating. It would also be desirable to reduce investment costs involved in a coating process, while minimizing waste. A high percentage of the $TiO_2$ particles should be coated by such a process, as any uncoated particles may result in a pigment having significantly lower durability. The present invention provides such a process.

Gonzalez, U.S. Pat. No. 5,562,764 discloses a process for the preparation of $TiO_2$, whereby a volatile silicon compound is added downstream of where the oxygen-containing gas and $TiCl_4$ are initially contacted to produce a substantially anatase-free $TiO_2$ pigment containing silica. The $TiO_2$ product has decreased particle size and agglomeration.

Kodas, et al., WO 96/36441, disclose a process to prepare coated $TiO_2$ pigment comprising oxidation of a titanium compound to form $TiO_2$ particles in a reactor, subsequently introducing at least one metal coating precursor into the reactor and oxidation of the precursor to form a metal oxide coating on the $TiO_2$ pigment particles. The metal oxide is selected from $SiO_2$, $Al_2O_3$, $ZrO_2$ and mixtures thereof.

Allen and Gergely in co-pending and co-assigned U.S. patent application Ser. No. 08/764,414, filed Dec. 11, 1996, now allowed, disclose a process to prepare rutile $TiO_2$ which comprises oxidation of $TiCl_4$ in the presence of an aluminum compound to produce a suspension of $TiO_2$ particles and then contacting the particles with a boron compound to provide a $TiO_2$ pigment containing $B_2O_3$. The $TiO_2$ product has decreased particle size and agglomeration, and less abrasion than conventional rutile $TiO_2$ pigments.

Glaeser, U.S. Pat. No. 4,214,913, discloses a process to prepare rutile $TiO_2$ which comprises oxidation of $TiCl_4$ in the presence of $AlCl_3$ and addition of $PCl_3$ into the oxidation at a point when at least 80% of the $TiCl_4$ has been converted to $TiO_2$. The $TiO_2$ product is provided in a state which can be directly used to prepare slurries for use in paper and board applications. It is stated that for use in coatings, the $TiO_2$ is wet treated.

Angerman and Moore, U.S. Pat. No. 3,856,929 disclose a process to prepare anatase $TiO_2$ which comprises oxidizing $TiCl_4$ in the presence of phosphorus and silicon halides. Adding silicon and phosphorus halides in combination is more effective than either halide alone at promoting formation of anatase $TiO_2$.

There is a need to provide a substantially rutile $TiO_2$ pigment having durability and gloss. There is also a need to reduce or eliminate problems associated with conventional wet treatment methods used to provide coatings on $TiO_2$ particles.

The present invention meets the foregoing needs.

SUMMARY OF THE INVENTION

The present invention provides a process for producing titanium dioxide pigment comprising the steps of:

a) reacting titanium tetrahalide in the vapor phase with an aluminum halide and an oxygen-containing gas in a reactor at a temperature in the range of about 900° C. to about 1600° C. to provide a gaseous suspension comprising $TiO_2$ particles;

b) contacting the gaseous suspension with at least two oxide precursors, wherein the first oxide precursor is a silicon halide and the second oxide precursor is selected from the group consisting of oxide precursors of boron, phosphorus, magnesium, niobium, germanium, and mixtures thereof, and c) cooling the gaseous suspension to provide a pigment comprising $TiO_2$ particles having a coating comprising silica and a second oxide, wherein the second oxide is selected from the group consisting of oxides of boron, phosphorus, magnesium, niobium, germanium, and mixtures thereof.

The resulting $TiO_2$ pigment is in substantially rutile form. Preferably, the aluminum halide is selected from the group consisting of $AlCl_3$, $AlBr_3$, $AlI_3$, and mixtures thereof and more preferably, the aluminum halide is $AlCl_3$. The $AlCl_3$ may be added in an amount sufficient to provide about 0.5 to about 10% by weight of $Al_2O_3$ based on the total pigment weight.

Preferably, the titanium dioxide pigment has a coating comprising 0.1 to 10 wt % silica, based on the total pigment weight, and from 0.5 mol % to 50 mol % of a second oxide, based on the total weight of the coating composition. Preferably, the second oxide is a boron oxide or a phosphorus oxide.

When the second oxide is a boron oxide, the oxide precursor is preferably a boron halide selected from the group consisting of $BCl_3$, $BBr_3$, $BI_3$, and mixtures thereof and more preferably, the boron halide is $BCl_3$. The boron oxide precursor may be added in an amount sufficient to provide from about 3 mol % to 50 mol % of boron calculated as $B_2O_3$, based on the total weight of the coating composition. Preferably, the boron compound is added in an amount sufficient to provide from about 6 mol % to 20 mol %, of boron as $B_2O_3$, based on the total weight of the coating composition.

When the second oxide is a phosphorus oxide, the oxide precursor is preferably a phosphorus halide such as phosphorus chloride or oxychloride, but may also be other phosphorus halides such as phosphorus bromide or oxybromide. Especially useful phosphorus halides are selected from the group consisting of phosphorus trichloride, phosphorus dichloride, phosphorus oxychloride, phosphorus pentachloride and mixtures thereof and more preferably, the phosphorus halide is $PCl_3$. The phosphorus oxide precursor may be added in an amount sufficient to provide from about 0.5 mol % to about 30 mol % phosphorus calculated as $P_2O_5$ based on the total weight of the coating composition. Preferably, the phosphorus is added in an amount sufficient to provide from about 1 mol % to about 15 mol % phosphorus as $P_2O_5$ based on the total weight of the coating composition.

The silicon halide and the second oxide precursor are added to the gaseous suspension of $TiO_2$ particles preferably in a conduit or flue where scouring particles or scrubs are added to minimize the buildup of $TiO_2$ in the interior of the flue during cooling.

The cooled $TiO_2$ pigment having a coating comprising silica and a second oxide, wherein the second oxide is selected from the group consisting of oxides of boron, phosphorus, magnesium, niobium, germanium, and mixtures thereof, may be recovered and subjected to milling such as media or fluid-energy milling.

DETAILED DESCRIPTION OF THE INVENTION

Figure 1:
FIG. 1 is a transmission electron micrograph at high magnification of a $TiO_2$ pigment comprising $TiO_2$ particles, each having a substantially uniform coating of about 3 nanometers (nm), comprising silica and phosphorus oxide.

The present invention provides a process for producing titanium dioxide ($TiO_2$) pigment having coatings comprising silica and a second oxide selected from the group consisting of oxides of boron, phosphorus, magnesium, niobium, germanium and mixtures thereof The resulting $TiO_2$ pigment is in substantially rutile form.

The process of the present invention involves reacting titanium tetrahalide (e.g., $TiCl_4$) in the vapor phase with an aluminum halide and an oxygen-containing gas in a reactor at a temperature in the range of about 900° C. to about 1600° C. to provide a gaseous suspension comprising $TiO_2$ particles, and contacting the gaseous suspension comprising $TiO_2$ particles with a first oxide precursor which is a silicon halide and a second oxide precursor selected from the group consisting of oxide precursors of boron, phosphorus, magnesium, niobium, germanium, and mixtures thereof, that will form an oxide under process conditions. As used herein, the term, "first oxide precursor", is meant to distinguish the first oxide precursor, i.e., the silicon halide from the "second oxide precursor", but it should not be construed to mean that the silicon halide must be added to the gaseous suspension prior to, i.e., upstream of, the second oxide precursor. The silicon halide and second oxide precursor can be added separately at the same or different points, or can be combined or premixed and added as a mixture to the gaseous suspension of $TiO_2$ particles. This process is described in greater detail below.

The production of $TiO_2$ pigment by the vapor phase oxidation of a titanium tetrahalide, particularly $TiCl_4$, is well known and disclosed in Schaumann, U.S. Pat. No. 2,488,439 and Krchma et al., U.S. Pat. No. 2,559,638, the disclosures of which are hereby incorporated by reference. In the production of $TiO_2$ pigment by the vapor phase oxidation of titanium tetrahalides, titanium tetrachloride ($TiCl_4$), titanium tetrabromide ($TiBr_4$), and/or titanium tetraiodide ($TiI_4$) may be used, but it is preferable to use $TiCl_4$. First, $TiCl_4$ is evaporated and preheated to temperatures of from about 300° C. to about 650° C. and introduced into a reaction zone of a reaction vessel. The aluminum halide in an amount sufficient to provide about 0.5% to about 10% $Al_2O_3$, preferably about 0.5% to about 5%, and more preferably about 0.5% to about 2% $Al_2O_3$ by weight based on total pigment weight is thoroughly mixed with the $TiCl_4$ prior to its introduction into the reaction zone of the reaction vessel. Suitable aluminum halides include, for example, $AlCl_3$, $AlBr_3$ and/or $AlI_3$. Preferably, $AlCl_3$, as disclosed in U.S. Pat. No. 2,559,638, is used in the process of the present invention.

The oxygen-containing gas is preheated to at least 1200° C. and is continuously introduced into the reaction zone through a separate inlet from an inlet for the $TiCl_4$ feed stream. By "reaction zone", it is meant the length of the reactor in which substantial reaction of the reactants takes place. The reaction of $O_2$ and $TiCl_4$ in the vapor phase is extremely fast and provides a hot gaseous suspension comprising $TiO_2$ particles and free chlorine. This reaction step is followed by a brief period of $TiO_2$ particle growth. Optionally, the oxygen-containing gas contains a nucleant. By "nucleant", it is meant any substance which can reduce the particle size of the pigment such as metals, oxides, salts or other compounds of sodium, potassium, lithium, rubidium, cesium, calcium, barium, strontium, and the like or mixtures thereof as disclosed in Lewis et al., U.S. Pat. No. 3,208,866 and Allen et al., U.S. Pat. No. 5,201,949. Particularly preferred nucleants are CsCl and KCl.

The hot gaseous suspension comprising the $TiO_2$ particles is then rapidly cooled in order to prevent undesirable particle size growth. Cooling of the hot gaseous suspension may be performed by methods known in the art. These methods typically involve passing the hot gaseous suspension through a cooling conduit (flue) having relatively cool walls in comparison to the gaseous suspension. Granular scouring particles (scrubs), such as calcined $TiO_2$, NaCl, KCl, sand, and mixtures thereof, may be added to the flue to reduce the formation of $TiO_2$ particulate deposits on the internal walls of the flue. This cooling step is described in greater detail in Rick, U.S. Pat. No. 2,721,626, Nerlinger, U.S. Pat. No. 3,511,308, Rahn et al., U.S. Pat. No. 3,475,258, and Diemer et al. co-pending, co-assigned U.S. patent application Ser. No, 08/703,303, filed Aug. 26, 1996, the disclosures of which are hereby incorporated by reference.

In carrying out the invention, the silicon halide and second oxide precursor are added downstream from the $TiCl_4$ stream addition. The exact point of addition of the silicon halide and second oxide precursor will depend on the reactor design, flow rate, temperatures, pressures and production rates. For example, the silicon halide and second oxide precursor may be added at one or more points downstream from where the $TiCl_4$ and oxygen-containing gas are initially contacted. Specifically, the temperature of the reaction mass at the point or points of silicon halide and second oxide precursor addition will range from about 500° C. to about 1600° C., preferably about 1000° C. to about 1600° C., at a pressure from about ambient pressure to about 100 psig, preferably at least 20 psig as described in Santos, U.S. Pat. No. 3,505,091. It will be understood by those skilled in the art that the temperature profile in the reactor will guide the choice of the appropriate addition points for the silicon halide and second oxide precursor.

The silicon halide and second oxide precursor may be added separately or in combination to the gaseous suspension of $TiO_2$ particles. When added separately, the silicon halide and second oxide precursor are added from different points downstream from where the $TiCl_4$ and oxygen-containing gas are initially contacted. Preferably, when the silicon halide and second oxide precursor (e.g., $H_3BO_3$ or $BCl_3$) are added separately, at least one addition of the second oxide precursor is prior to, i.e., upstream of, the first addition of the silicon halide.

When the silicon halide and second oxide precursor (e.g., $PCl_3$) are added in combination, they may be premixed and then added at one or more points downstream from where the $TiCl_4$ and oxygen-containing gas are initially contacted and form the gaseous suspension of $TiO_2$ particles. Alternatively, the silicon halide and second oxide precursor may be added in combination to the gaseous suspension of $TiO_2$ particles without premixing. For example, the silicon halide and second oxide precursor may be fed from individual feed systems, and fed through a common feed point to the gaseous suspension of $TiO_2$ particles. Preferably, there is no premixing of the silicon halide and the second oxide precursor when added in combination and fed through a common feed point.

Suitable silicon halides include $SiCl_4$, $SiBr_4$, and $SiI_4$, preferably $SiCl_4$. The $SiCl_4$ can be introduced as either a vapor or liquid. Often, the silicon halide will be added in an amount sufficient to provide from about 0.1 to about 10 wt % silica, preferably about 0.5 to 6 wt % silica, based on the total weight of $TiO_2$ pigment.

The second oxide precursor can be an oxide precursor of boron, phosphorus, magnesium, niobium, germanium, and mixtures thereof. By "oxide precursor", it is meant that the second compound will form an oxide under the conditions present in the process. Typically, the second oxide precursor will be a halide or other volatile compound. Preferably, the second oxide precursor is a boron or phosphorus compound.

For example, suitable precursors of boron oxide include, boron halides (e.g., $BCl_3$, $BBr_3$, and $BI_3$, preferably $BCl_3$), volatile boron organic compounds (e.g., trimethylborate, boron hydrides), and low melting-point boron compounds (e.g., boric acid). In general, boron compounds which can be converted into a fluid boron oxide at process temperatures are suitable precursors. Preferably, boron trichloride or boric acid is used. When the second oxide precursor is a boron compound, it will often be added in an amount sufficient to provide from 3 mol % to 50 mol % of boron calculated as $B_2O_3$, based on the total weight of the coating composition, preferably from about 6 mol % to 20 mol % of boron as $B_2O_3$, based on the total weight of the coating composition.

Suitable precursors of phosphorus oxide include phosphorus halides and oxyhalides, preferably chlorides and oxychlorides, but bromides and oxybromides can also be used. Preferably, the phosphorus oxide precursor is phosphorus trichloride, phosphorus oxychloride, phosphorus dichloride, or phosphorus pentachloride. Most preferred is phosphorus trichloride. When the second oxide precursor is a phosphorus compound, such as a phosphorus halide, it will often be added in an amount sufficient to about 0.5 mol % to about 30 mol % phosphorus calculated as $P_2O_5$, preferably about 1 mol % to about 15 mol % phosphorus as $P_2O_5$ based on the total weight of the coating composition.

In a preferred embodiment, the $SiCl_4$ and second oxide precursor are added downstream in the conduit or flue where the scouring particles or scrubs are added to minimize the build-up of $TiO_2$ in the interior of the flue as described in greater detail in Rick, U.S. Pat. No. 2,721,626. In this embodiment, the $SiCl_4$ and second oxide precursor, for example, $BCl_3$ or $PCl_3$ can be added downstream alone, or at the same point where the scrubs are introduced into the flue. However, it should be recognized that in the practice of the present invention, the addition of scrubs is optional.

While not wishing to be bound by theory, it is suggested that the second oxide precursor acts as a melting point modifier for silica, wherein the melting point of silica is reduced and the silica is able to deposit more uniformly on the surfaces of the $TiO_2$ particles. Further, when the second oxide precursor is added separately prior to the silicon halide, the second oxide may form a coating on the $TiO_2$ particles. Upon addition of the silicon halide, the second oxide coating may serve as a bonding layer to facilitate uniform deposition of silica onto the $TiO_2$ particles.

The silicon halide and second oxide precursor oxidize and become incorporated on the surface of the $TiO_2$ particles as a coating of silica incorporating the second oxide. As a result of mixing of the reactant streams, substantially complete oxidation of $TiCl_4$, $AlCl_3$, $SiCl_4$, and the second oxide precursor takes place but for conversion limitations imposed by temperature and thermochemical equilibrium. Solid particles of $TiO_2$ form. The reaction product containing a suspension of $TiO_2$ particles in a mixture of chlorine and residual gases is carried from the reaction zone at temperatures considerably in excess of 1200° C. and is subjected to fast cooling in the flue as described above or other conventional means.

The $TiO_2$ pigment is recovered from the cooled reaction products by conventional separation treatments, including cyclonic or electrostatic separating media, filtration through porous media or the like. The recovered $TiO_2$ pigment may be subjected to wet treatment, milling, grinding or disintegration treatment to obtain the desired level of agglomeration. It will be recognized that the addition of silica and second oxide in accordance with this invention provides a durable $TiO_2$ pigment, while offering the flexibility of reducing or eliminating the amount of silica added in a subsequent wet treatment step. It is recognized that wet treatment may be used, if desired, to provide a pigment with even greater durability.

In general, the process of the present invention provides several advantages including the following:
1) a coated $TiO_2$ pigment without the need for a wet treatment process with the inherent disadvantages of wet treatment processes;
2) a reduction in coarse fraction of $TiO_2$ particles (i.e., a reduction in weight percentage of $TiO_2$ particles having a diameter size greater than 0.6 microns) and higher pigment carbon black undertone (CBU);
3) a coated $TiO_2$ pigment having good gloss;
4) a $TiO_2$ pigment in substantially rutile form; and
5) a more uniform coating of $TiO_2$ particles, i.e., consistent coating thickness around a given $TiO_2$ particle, with less silica debris than available from wet treatment processes.

The process of the present invention provides a titanium dioxide pigment comprising $TiO_2$ particles having a coating comprising silica and a second oxide, wherein the second oxide is selected from the group consisting of oxides of boron, phosphorus, magnesium, niobium, germanium and mixtures thereof. Surprisingly, the process of this invention provides $TiO_2$ pigments having uniform coating of silica incorporating the second oxide. By "uniform coating", it is meant that the thickness of the coating is generally consistent around a given particle. It is understood though that the coating thickness on one particle may differ from the coating thickness on a different particle by some small amount.

Figure 2:
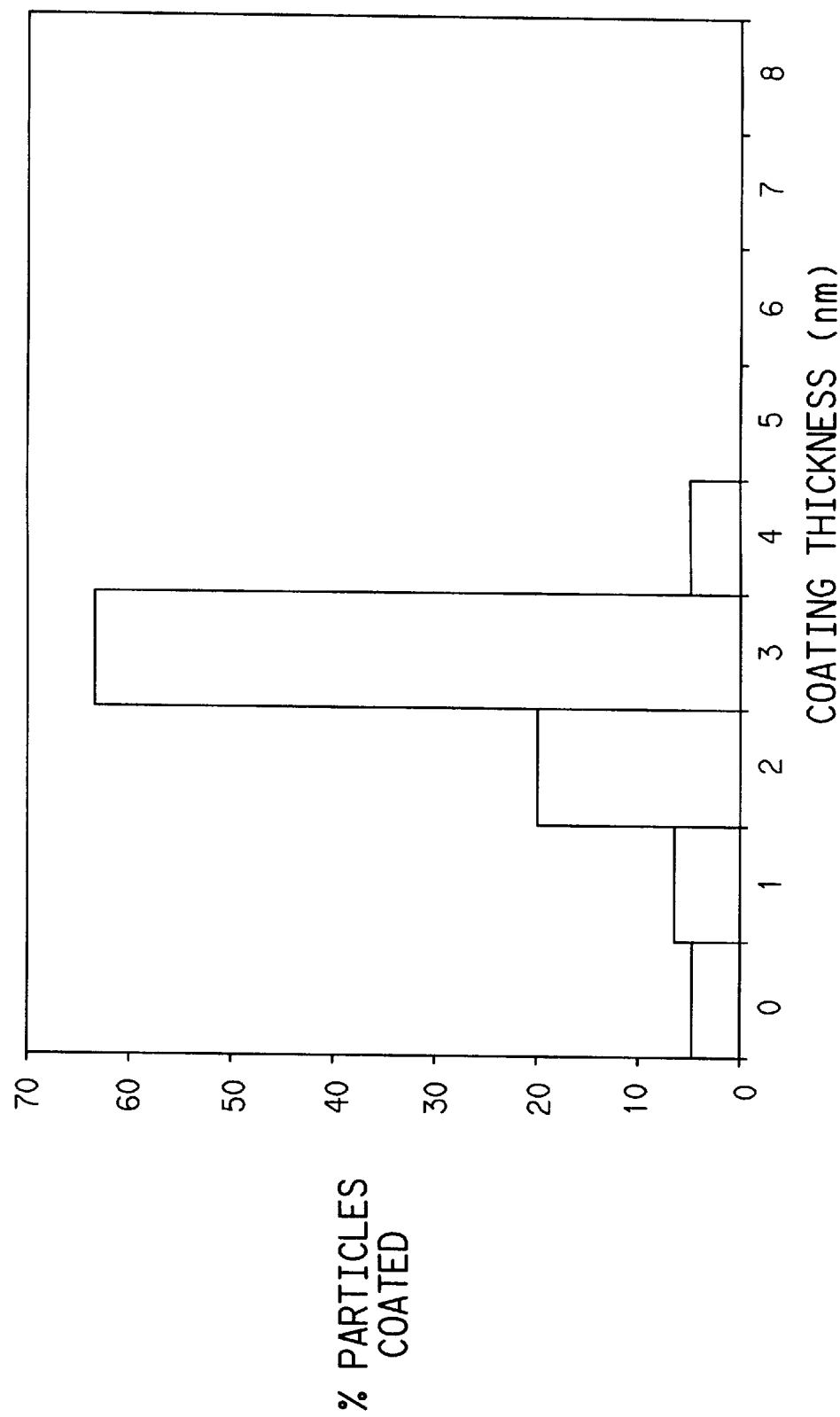
FIG. 2 is a histogram of the coating thickness distribution obtained from analysis of the sample shown in FIG. 1, showing that approximately 90% of the $TiO_2$ particles have a coating comprising silica and phosphorus halide. The histogram is based on analysis of at least 1000 particles.
Figure 4:
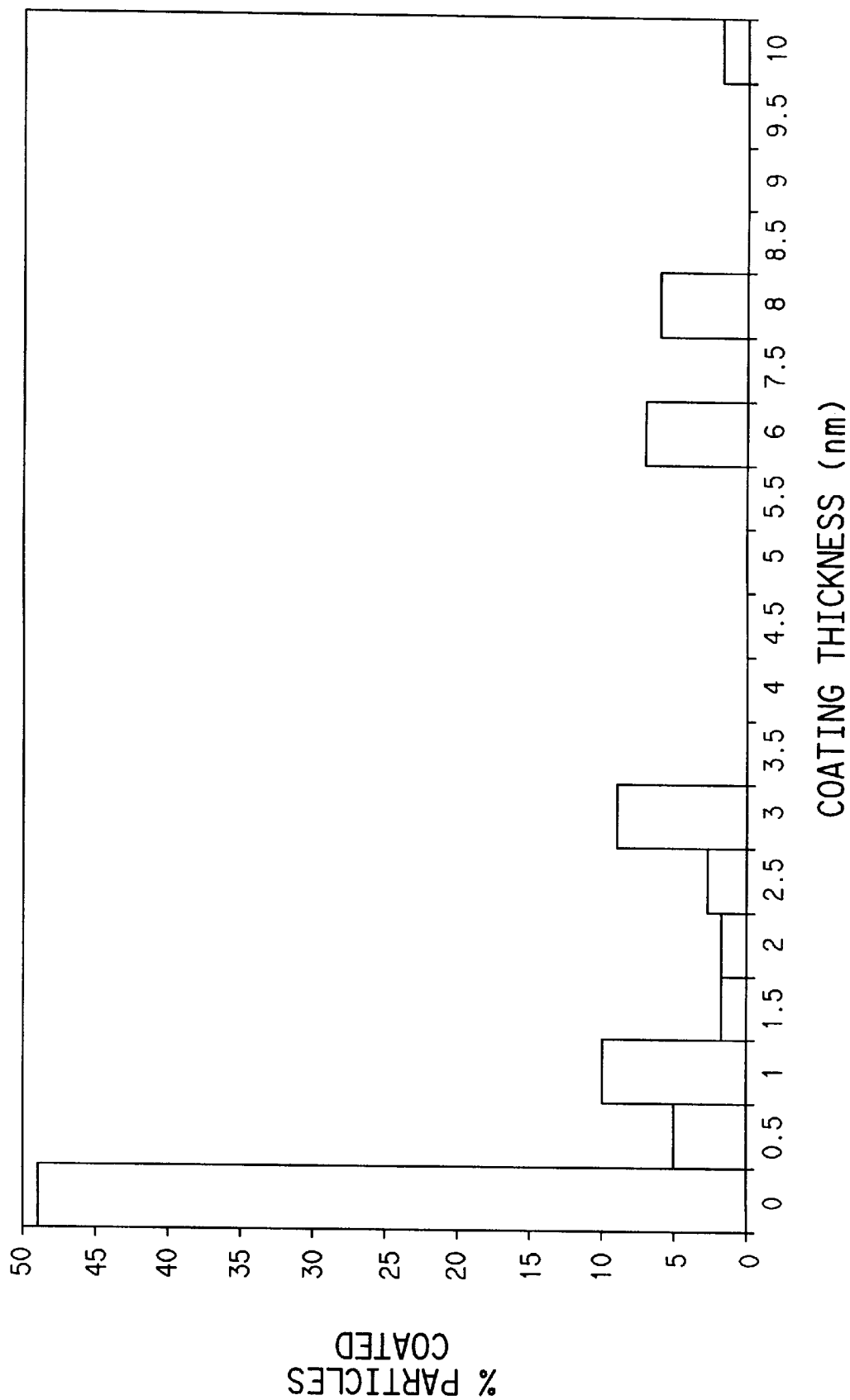
FIG. 4 is a histogram of the coating thickness distribution obtained from analysis of the sample shown in FIG. 3, showing that approximately 50% of the $TiO_2$ particles are uncoated, and the remaining particles have a non-uniform coating of variable thickness, comprising silica. The histogram is based on analysis of at least 1000 particles.

Moreover, by use of the second oxide precursor with the silicon halide, a larger proportion of the particles are coated with silica than occurs in the absence of the second oxide precursor at the same silica loading. Thus, with the present invention, durability may be achieved at a lower silica loading. As shown in FIG. 2, in a preferred embodiment, the titanium dioxide pigments produced by the process of this invention using a silicon halide and a second oxide precursor, have approximately 90% of the particles coated at a silica loading of 2.5 wt %, based on total pigment weight. In comparison, as shown in FIG. 4, approximately 50% of the particles are coated in the absence of the second oxide precursor at the same silica loading of 2.5 wt %, based on total pigment weight.

The present invention is further illustrated by the following examples using the following test methods, but these examples should not be construed as limiting the scope of the invention.

Test Methods

CAC Test

A Catalytic Activity Coefficient (CAC) is a measure of durability based on ultraviolet reactivity of $TiO_2$ pigment in a test based on $TiO_2$ catalyzed reduction of lead carbonate to the metal. An air-seal dispersion of non-durable $TiO_2$ and lead carbonate in an organic medium turns from white to almost black by exposure to ultraviolet light. With durable $TiO_2$ pigments the paste turns light gray. A drop of a paste of basic lead carbonate, glycerol, fumed silica, and $TiO_2$ pigment is put between two glass microscope slides and exposed to ultraviolet light for about 5 hours. The darkness of these slides is compared to Munsell chips and the CAC values determined. The CAC decreases as durability increases, i.e., a lower CAC value means greater durability. The CAC is described in greater detail in J. Braun, "$TiO_2$'s Contribution to the Durability and Degradation of Paint Film II. Prediction of Catalytic Activity", vol. 62, Journal of Coating Technology, pp. 37–42 (1990), the teachings of which are incorporated herein by reference.

Microscopy

High resolution-transmission electron microscopy (HR-TEM) was used to determine coating thickness, coating uniformity, and fraction of coated particles. It should be noted that HR-TEM is a two dimensional projection of 3-dimensional particles. Extent of coating and coating on all sides (including top and bottom) surfaces were examined by sample tilting. A minimum population of 1000 particles was measured from micrographs of a sample. Standard procedures for histograms were utilized.

EXAMPLES

Comparative Example A

Base $TiO_2$ produced by the chloride process was fed to a rotary calciner and calcined at 600–1000° C. for about 8 hours. 39 grams of the calcined $TiO_2$ were loaded into a fluidized bed reactor. The temperature of the reactor was raised at 15° C./minute to 930° C. Oxygen was introduced into the reactor to provide fluidization of the $TiO_2$ at a rate of 2.8 liters/minute. 30 mol % $SiCl_4$ in argon was introduced through the top of the reactor through a gas inlet tube immersed into the fluidized bed at a rate of 0.5 liters/minute for 2 minutes. The $TiO_2$ was cured in the reactor for 8 minutes. The reactor was shut off and the product in the reactor cooled to ambient temperature. Silica content of the product was 4 wt %.

Example 1

28 grams of calcined $TiO_2$ prepared as described in Comparative Example A were loaded into a fluidized bed reactor. The temperature was raised and the bed fluidized as described in Example 1. 1.1 grams of boric acid ($H_3BO_3$) were added to the top of the bed over a period of about 5 minutes. $SiCl_4$ was added to the bed as described in Example 1 and the $TiO_2$ was cured in the reactor for 8 minutes. The product was recovered as in Example 1. Silica content of the product was 1.9 wt %; boron content was 6.9 mol %.

The products of Comparative Examples A and Example 1 were tested for durability using the CAC method described above.

TABLE 1

| | Durability Testing | | | |
|---|---|---|---|---|
| Example | CAC | Wt % $SiO_2$ | mol % $B_2O_3$ | ppm B |
| A | 0.26 | 4.0 | 0.0 | 0 |
| 1 | 0.11 | 1.9 | 6.9 | 500 |

It can be seen from Table 1 that the example incorporating both $B_2O_3$ and $SiO_2$ exhibited improved durability as measured by the CAC test relative to the comparative example A.

Example 2

A gaseous suspension of uncoated pigmentary $TiO_2$ particles prepared by the chloride process were fed using a screw feeder to a quartz tube at 1000° C. and a flow rate of 0.50 gram/minute. A vaporous mixture of $SiCl_4$ and $PCl_3$ were fed with air, counter-current to the flow of $TiO_2$, to provide a $TiO_2$ pigment having a uniform coating of 3 nm consisting of 2.56 wt % $SiO_2$, based on total weight of the pigment and 1.9 mol % $P_2O_5$ (0.12 wt %), based on the total coating composition. As shown in FIG. 1, each of the $TiO_2$ particles have a substantially uniform coating comprising silica and phosphorus oxide. As shown in the histogram of FIG. 2, the percentage of $TiO_2$ particles in FIG. 1 which are coated is approximately 90% based on measurements taken of approximately 1000 $TiO_2$ particles from many areas.

Comparative Example B

Figure 3:
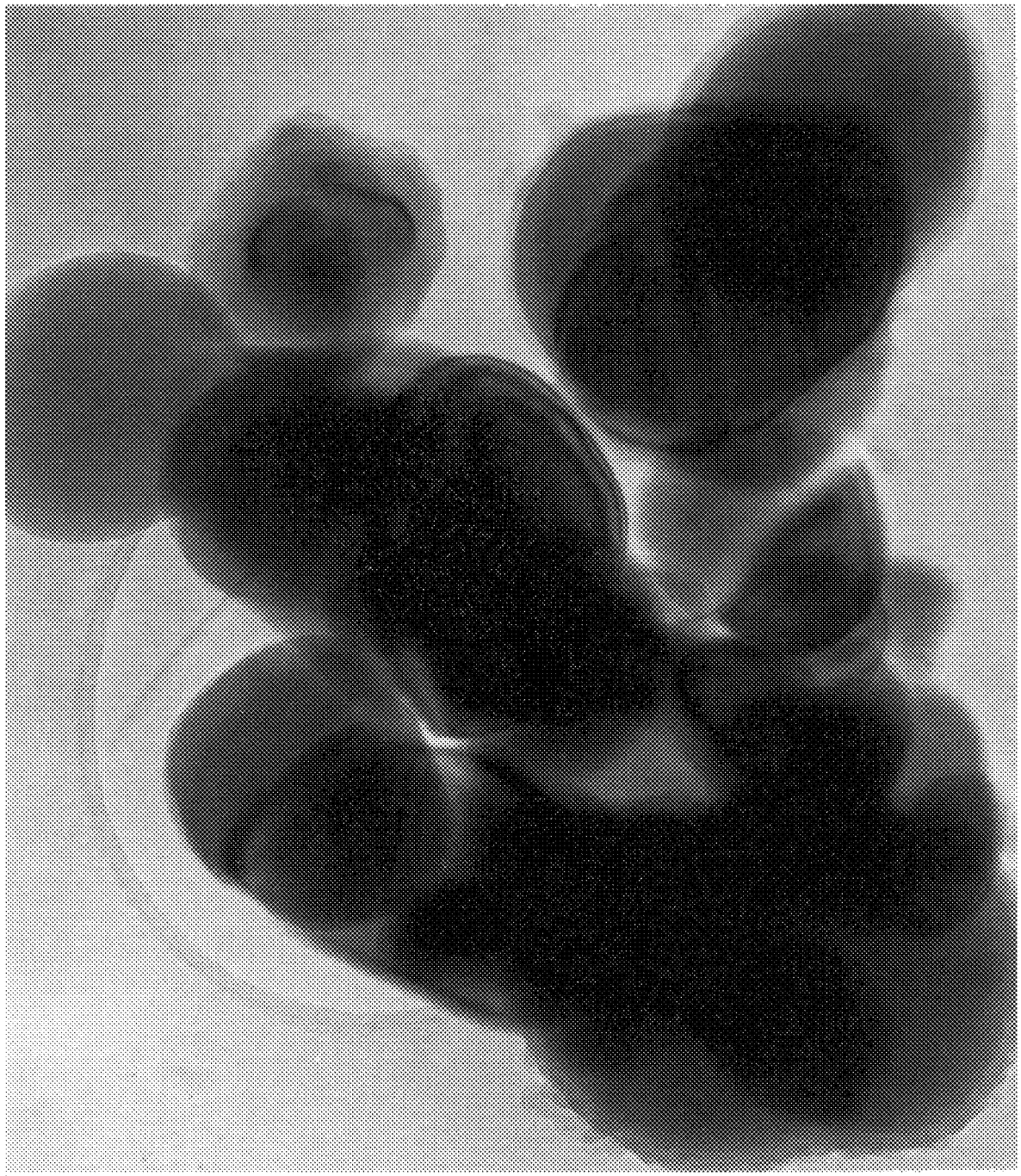
FIG. 3 is a transmission electron micrograph at high magnification of a $TiO_2$ pigment comprising $TiO_2$ particles, each having a substantially non-uniform coating of variable thickness, comprising silica.

TiCl$_4$ feed was thoroughly premixed with AlCl$_3$ in an amount sufficient to provide 1 wt % Al$_2$O$_3$ based on total pigment weight. The TiCl$_4$ feed was evaporated and preheated to 425° C. and introduced to a reaction zone at a rate corresponding to the production rate of 4.5 tons/hr of TiO$_2$ pigment product. Simultaneously, preheated oxygen was continuously introduced through a separate inlet adjacent to the TiCl$_4$ inlet. Trace amounts of KCl dissolved in water were added to the oxygen stream as disclosed in British Patent 922,671 and U.S. Pat. No. 3,208,866, the teachings of which are incorporated herein by reference. SiCl$_4$ was fed to the reactor as a finely dispersed liquid at a location 5 feet (1.5 meters) downstream (or about 0.02–0.04 seconds from the point at which the TiCl$_4$ and oxygen are initially contacted) at the same point as the scrubs at a rate and at an amount sufficient to provide a loading of 2.5 wt % SiO$_2$ based on the total pigment weight. The TiCl$_4$ temperature was 425° C. and the oxygen temperature was 1595° C. The estimated temperature of the reaction mass at the point of SiCl$_4$ injection was about 1400 to 1500° C. for the reaction zone at a pressure of about 50 psig. As shown in FIG. 3, each of the TiO$_2$ particles have a substantially non-uniform coating with thickness ranging from 0 to 10 nm. As shown in the histogram of FIG. 4, the percentage of TiO$_2$ particles in FIG. 3 which are coated is approximately 50% based on measurements taken of approximately 1000 TiO$_2$ particles from many areas. Particles of silica were also found present as debris.

We claim:

1. A process for producing a titanium dioxide pigment, comprising the steps of:
    a) reacting titanium tetrachloride in the vapor phase with an aluminum halide and an oxygen-containing gas in a reactor at a temperature in the range of about 900° C. to about 1600° C. to provide a gaseous suspension comprising TiO$_2$ particles;
    b) contacting the gaseous suspension with at least two oxide precursors, wherein a first oxide precursor is a silicon halide and a second oxide precursor is selected from the group consisting of oxide precursors of boron, phosphorus, magnesium, niobium, germanium, and mixtures thereof; and
    c) cooling the gaseous suspension to provide a pigment comprising TiO$_2$ particles having a coating comprising silica and a second oxide wherein the second oxide is selected from the group consisting of oxides of boron, phosphorus, magnesium, niobium, germanium, and mixtures thereof.

2. The process of claim 1, wherein the aluminum halide is AlCl$_3$.

3. The process of claim 1, wherein the second oxide precursor is a boron compound and the pigment produced by the process comprises TiO$_2$ particles having a coating comprising silica and boron oxide.

4. The process of claim 3, wherein the coating comprises about 0.1 to about 10 wt. % silica, based on the total weight of the pigment and from about 3 to about 50 mol % boron oxide, based on the total coating composition.

5. The process of claim 3, wherein the boron compound is a boron halide selected from the group consisting of BCl$_3$, BBr$_3$, BI$_3$, and mixtures thereof.

6. The process of claim 1, wherein the second oxide precursor is a phosphorus compound and the pigment produced by the process comprises TiO$_2$ particles having a coating comprising silica and phosphorus oxide.

7. The process of claim 6, wherein the coating comprises about 0.1 to about 10 wt. % silica, based on the total weight of the pigment and from about 0.5 to about 30 mol % phosphorus oxide, based on the total coating composition.

8. The process of claim 6, wherein the phosphorus compound is a phosphorus halide selected from the group consisting of PCl$_3$, POCl$_3$, PHCl$_2$, PCl$_5$, and mixtures thereof.

9. The process of claim 1, wherein the pigment has a substantially rutile crystalline structure.

10. The process of claim 1, wherein the second oxide precursor is added separately from, and prior to, the addition of the silicon halide.

11. The process of claim 10, wherein the second oxide precursor is an oxide precursor of boron.

12. The process of claim 1, wherein the titanium dioxide pigment has a substantially uniform coating comprising silica and a second oxide, selected from the group consisting of oxides of boron, phosphorus, magnesium, niobium, germanium, and mixtures thereof.

* * * * *